US012359775B2

(12) United States Patent
Stahl et al.

(10) Patent No.: US 12,359,775 B2
(45) Date of Patent: Jul. 15, 2025

(54) MOTOR VEHICLE COMPRISING A HARD SHELL FOR PROTECTING A FUEL-CARRYING CONNECTING ELEMENT

(71) Applicant: Bayerische Motoren Werke Aktiengesellschaft, Munich (DE)

(72) Inventors: Hans-Ulrich Stahl, Munich (DE); Christoph Warkotsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 295 days.

(21) Appl. No.: 17/784,923

(22) PCT Filed: Dec. 7, 2020

(86) PCT No.: PCT/EP2020/084885
§ 371 (c)(1),
(2) Date: Jun. 13, 2022

(87) PCT Pub. No.: WO2021/116020
PCT Pub. Date: Jun. 17, 2021

(65) Prior Publication Data
US 2023/0008726 A1    Jan. 12, 2023

(30) Foreign Application Priority Data
Dec. 12, 2019   (DE) .................... 10 2019 134 120.5

(51) Int. Cl.
*F17C 13/08*    (2006.01)

(52) U.S. Cl.
CPC .... *F17C 13/084* (2013.01); *F17C 2201/0138* (2013.01); *F17C 2203/0604* (2013.01); *F17C 2203/0612* (2013.01)

(58) Field of Classification Search
CPC ............ F17C 13/084; F17C 2201/0138; F17C 2203/0604; F17C 2203/0612;
(Continued)

(56) References Cited

U.S. PATENT DOCUMENTS 6,257,360 B1 *   7/2001   Wozniak .............. B60K 15/013
                                                 180/69.5
11,435,031 B2 *   9/2022   Park .......................... F17C 1/00
(Continued)

FOREIGN PATENT DOCUMENTS

CN         101500837 A      8/2009
CN         105083477 A      11/2015
(Continued)

OTHER PUBLICATIONS

WO-2020012080-A1 English Translation (Year: 2020).*
(Continued)

*Primary Examiner* — James A Shriver, II
*Assistant Examiner* — Michael T. Walsh
(74) *Attorney, Agent, or Firm* — Crowell & Moring LLP

(57) ABSTRACT

A motor vehicle includes at least one pressure vessel for storing fuel, and at least one holder for holding the pressure vessel. When installed, the holder encloses one end of the pressure vessel. The holder has a hard shell and an inner layer, wherein at least regions of the inner layer, when installed, are arranged between the hard shell and the connecting element. The hard shell has a higher rigidity than the inner layer.

16 Claims, 1 Drawing Sheet

(58) Field of Classification Search
CPC ........ F17C 2201/0109; F17C 2201/035; F17C 2201/056; F17C 2203/0617; F17C 2203/0619; F17C 2203/0663; F17C 2205/0138; F17C 2205/0142; F17C 2205/0146; F17C 2205/0192; F17C 2205/0196; F17C 2205/0326

See application file for complete search history.

(56) References Cited

U.S. PATENT DOCUMENTS

| | | | | |
|---|---|---|---|---|
| 12,044,359 | B2 * | 7/2024 | Nakamura | F17C 1/02 |
| 12,044,360 | B2 * | 7/2024 | Schaich | F16K 31/0655 |
| 2006/0033322 | A1 * | 2/2006 | Suess | B60K 15/07 |
| | | | | 280/830 |
| 2010/0018591 | A1 | 1/2010 | Jauss | |
| 2011/0168600 | A1 * | 7/2011 | Hilbert | G21F 5/08 |
| | | | | 206/521 |
| 2018/0292048 | A1 * | 10/2018 | Stahl | F17C 1/06 |
| 2019/0047409 | A1 * | 2/2019 | Kataoka | B60K 15/067 |
| 2024/0360962 | A1 * | 10/2024 | Gutmann | F16C 27/063 |
| 2024/0369190 | A1 * | 11/2024 | Kim | F17C 13/00 |

FOREIGN PATENT DOCUMENTS

| | | | |
|---|---|---|---|
| DE | 10 2005 037 636 A1 | 2/2006 | |
| DE | 10 2008 037 569 A1 | 6/2010 | |
| DE | 10 2011 050 054 A1 | 11/2012 | |
| DE | 102014009342 A1 * | 12/2015 | ............... F17C 1/16 |
| DE | 10 2017 210 720 A1 | 12/2018 | |
| DE | 102017210722 A1 * | 12/2018 | ............. F17C 13/00 |
| DE | 10 2018 116 090 A1 | 2/2019 | |
| DE | 102017220879 A1 * | 5/2019 | |
| WO | WO-2012150137 A2 * | 11/2012 | ............... F17C 1/06 |
| WO | WO 2016/206580 A1 | 12/2016 | |
| WO | WO-2020012080 A1 * | 1/2020 | ............. B60K 15/07 |

OTHER PUBLICATIONS

DE-102017210722-A1 English Translation (Year: 2018).*
DE-102014009342-A1 English Translation (Year: 2015).*
WO-2020012080-A English Translation (Year: 2020).*
DE-102017220879-A1 English Translation (Year: 2019).*
WO-2012150137-A2 English Translation (Year: 2012).*
International Search Report (PCT/ISA/210) issued in PCT Application No. PCT/EP2020/084885 dated Mar. 5, 2021 with English translation (six (6) pages).
German-language Written Opinion (PCT/ISA/237) issued in PCT Application No. PCT/EP2020/084885 dated Mar. 5, 2021 (seven (7) pages).
German-language Search Report issued in German Application No. 10 2019 134 120.5 dated Aug. 7, 2020 with partial English translation (11 pages).
Chinese-language Office Action issued in Chinese Application No. 202080085932.4 dated Apr. 13, 2023 with English translation (16 pages).

* cited by examiner

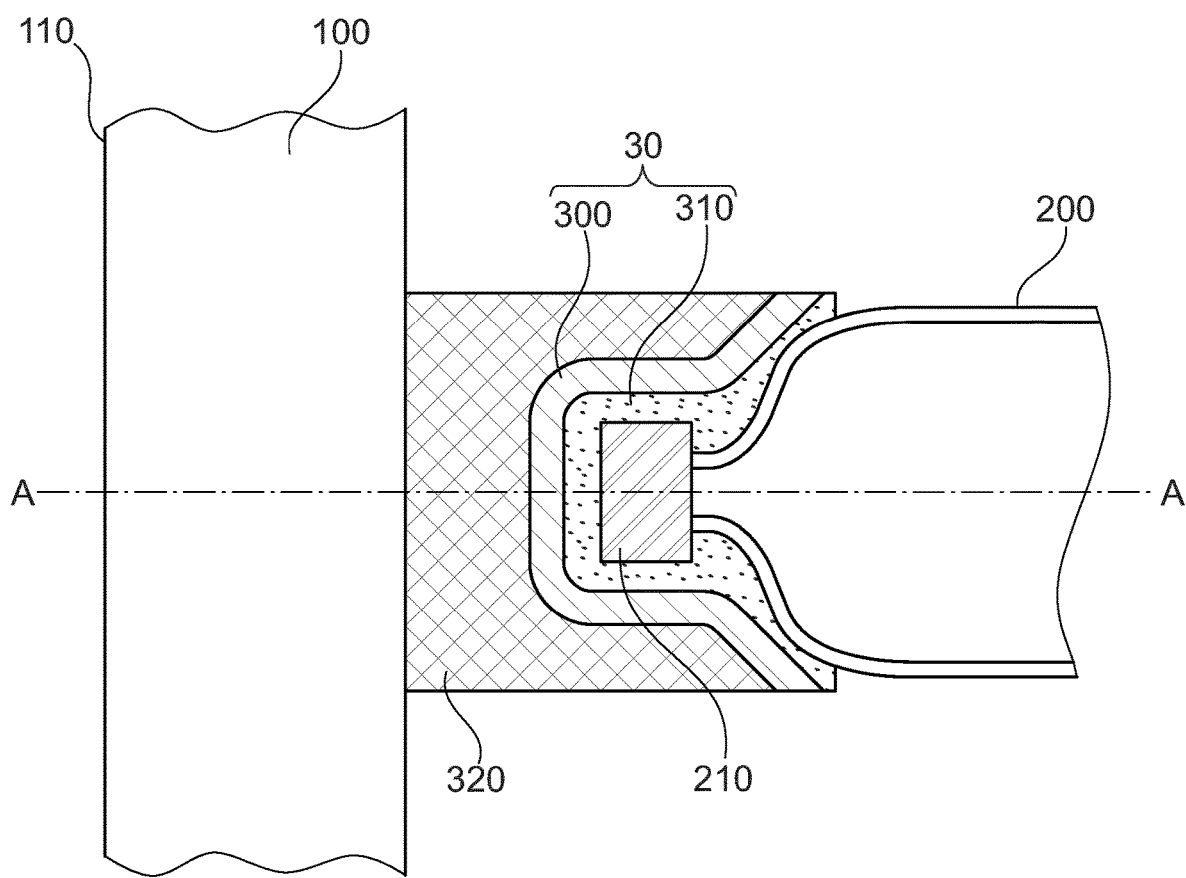

MOTOR VEHICLE COMPRISING A HARD SHELL FOR PROTECTING A FUEL-CARRYING CONNECTING ELEMENT

BACKGROUND AND SUMMARY

Motor vehicles driven with gaseous fuels are known. Conventional pressure vessels are generally comparatively large and can be incorporated in existing vehicle architectures only laboriously. There is also a need to further enhance safety.

A preferred object of the technology disclosed here is at least to reduce or to eliminate a disadvantage of an already known solution or to propose an alternative solution. It is in particular a preferred object of the technology disclosed here to incorporate pressure vessels for gaseous fuels as safely as possible in the motor vehicles and at the same time to provide an especially high fuel storage volume in the motor vehicle. Further preferred objects can result from the advantageous effects of the technology disclosed here.

The technology disclosed here relates to a motor vehicle. The motor vehicle may be a passenger car, a motorcycle or a utility vehicle. The motor vehicle comprises i) at least one pressure vessel for storing fuel; and ii) at least one holder for retaining the pressure vessel, wherein the holder encloses one end of the pressure vessel in the installation position. The holder comprises a hard shell and an inner layer, wherein the inner layer is arranged at least in certain regions between the hard shell and the connection element in the installation position, wherein the hard shell has a higher rigidity than the inner layer.

The pressure vessel serves to store fuel which is gaseous under ambient conditions. The pressure vessel can be used for example in a motor vehicle which is driven with compressed natural gas (also referred to as CNG) or liquefied natural gas (also referred to as liquid natural gas or LNG) or with hydrogen. The pressure vessel is fluidly connected to at least one energy converter (e.g. a fuel cell), which is configured to convert the chemical energy of the fuel into other forms of energy. The pressure vessel generally comprises: at least one fiber-reinforced layer or reinforcement, which expediently surrounds a liner. However, linerless pressure vessels are also contemplated. Such pressure vessels are also referred to as composite overwrapped pressure vessels.

The pressure vessel may be a cryogenic pressure vessel or a high-pressure gas vessel, for example. High-pressure gas vessels are designed to store fuel at ambient temperatures permanently at a nominal operating pressure (also referred to as nominal working pressure or NWP) of approx. 350 bar(g) (=gage pressure above atmospheric pressure), further preferably of approx. 700 bar(g) or more. A cryogenic pressure vessel is suitable for storing the fuel at the aforementioned operating pressures even at temperatures considerably below the operating temperature of the motor vehicle.

The motor vehicle may comprise a plurality of pressure vessels. For example, it is possible to provide multiple pressure vessels with longitudinal axes that lie parallel to one another. The individual pressure vessels may each have a length:diameter ratio with a value of between 5 and 200, preferably between 7 and 100, and particularly preferably between 9 and 50. The length:diameter ratio is the quotient calculated from the length of the pressure vessel in the numerator and the external diameter of the pressure vessel in the denominator. The individual pressure vessels can also be referred to as storage tubes. The multiple pressure vessels then form a system which is also referred to as tubular storage system. Such a system is suitable particularly for shallow installation spaces, in particular in the underfloor area below the vehicle interior. Expediently, the pressure vessels, which are arranged parallel to one another, are coupled to one another mechanically at each of their ends. This advantageously produces a system which can be mounted as a whole in the installation space provided in the motor vehicle. Advantageously, it may also be provided that at both ends there are provided respective bodyshell attachment points, which are common to the multiple pressure vessels and by means of which the system as a whole can be fastened in the motor vehicle.

In one configuration, the pressure vessels are connected in series. It is possible for generally curved fluid connection elements to be provided between the individual pressure vessels. It is particularly preferably possible for the pressure vessels and the fluid connection elements to be designed such that they can be produced together in a continuous manufacturing process. For this purpose, a common liner may be provided, for example, which is produced in a continuous extrusion process and around which are braided or wound (in a spiralized manner) reinforcing fibers in a likewise continuous process. This type of tubular storage system is also referred to as chain tank or snake tank. In order to avoid overheating in "blind alleys" when fueling, the end of the vessels connected in series can be connected to the start again in order to allow a throughflow to occur during the fueling (for example by means of a Venturi nozzle).

In one configuration, the pressure vessels are connected in parallel. In this case, a common distributor tube may be provided. The multiple pressure vessels are generally connected directly to the distributor tube, without a respective dedicated shut-off valve which is electrically actuable from the outside being provided between the distributor tube and the individual pressure vessels. Advantageously, the multiple pressure vessels are materially bonded (by means of adhesive bonding and/or by means of welding) to the distributor tube, with the result that the individual pressure vessels cannot be detached from the distributor tube non-destructively. The distributor tube serves to produce a fluid connection with the individual pressure vessels. On the distributor tube there may be provided an electrically actuable and normally closed shut-off valve, which is configured to shut off the distributor tube with respect to the rest of the fuel-carrying lines of the fuel supply system leading to the energy converter. This shut-off valve has the function of an on-tank valve of a conventional pressure vessel. Expediently, only one normally closed shut-off valve is provided on the distributor tube. The shut-off valve may be screwed directly onto or into the distributor tube, for example. The shut-off valve is the first valve provided downstream of each pressure vessel connected to the common distributor tube. A pipe rupture safety device, also referred to as excess flow valve, may be provided on each pressure vessel or on the distributor tube. In this way, it is possible to achieve additional safety in the event of rupture of the distributor tube.

It is also possible to use the connecting tube to mechanically couple the individual pressure vessels and possibly to form common bodyshell attachment points. The connecting tube may therefore form a unit which can be incorporated as a whole into the motor vehicle. A combination of parallel and series connections is also possible.

The at least one holder serves to retain the pressure vessel. The holder and the energy-absorbing deformation element disclosed here may be configured to connect one end of the pressure vessel to the vehicle bodyshell element in a load-bearing manner. The forces and moments arising during operation of the motor vehicle can therefore be transmitted between the vehicle bodyshell and the pressure vessel by way of the holder or by way of the deformation element. The holding element thus at the same time serves as a bearing point. Advantageously, a particularly space-saving bodyshell attachment can therefore be produced. A respective holder is preferably provided at each end of the pressure vessel. The forces and moments caused by the pressure vessel (e.g. its own weight, etc.) are preferably transmitted to the vehicle bodyshell by way of the holder. The holder preferably lies against or is only slightly spaced apart from one end of the pressure vessel and/or the connection element or the distributor tube. Advantageously, a substantially constant distance between the cross-sectional contour of the hard shell of the holder and the outer contour at the enclosed end of the pressure vessel is provided.

The holder is expediently not provided in the shell region of the pressure vessel. Advantageously, this makes it possible to better utilize the installation space and to ensure better heat exchange between the pressure vessel and the surrounding area.

The holder encloses one end of the pressure vessel in the installation position. Those constituent parts of the connection element that project from the pressure vessel in the installation position of the connection element may be received inside the holder. In one embodiment, the holder may be configured to enclose the ends of multiple pressure vessels, in particular the distributor tube or multiple connection elements.

The holder comprises a hard shell and an inner layer. The inner layer is provided inside the hard shell. The inner layer is arranged at least in certain regions between the hard shell and the connection element in the installation position. The hard shell has a higher rigidity than the inner layer. Consequently, the structure resembles that of a crash helmet. The inner layer may have a flexible configuration such that forces and moments to be transmitted by the holder can be introduced over the pressure vessel surface as uniformly as possible and without local stress peaks.

The hard shell generally has a wall thickness of a few millimeters. The inner layer generally has a greater wall thickness than the hard shell. The inner layer has a flexible design such that the inner layer reversibly compensates changes in length caused by the operation of the at least one pressure vessel. The inner layer lies against the outer wall of the pressure vessel.

An additional energy-absorbing deformation element may be provided between the holder and the vehicle bodyshell element in the direction of the pressure vessel longitudinal axis in the installation position of the pressure vessel. The vehicle bodyshell element (such as a longitudinal member or a crossmember, for example) itself naturally already has an energy dissipating action in the event of an accident. The deformation element is configured to convert kinetic energy arising in the event of an impact into deformation work. For this purpose, the deformation element may have an energy dissipation path, which extends in the direction of the pressure vessel longitudinal axis. The deformation element may have a length of at least 15 cm or of at least 10 cm or of at least 5 cm in the direction of the pressure vessel longitudinal axis, for example. The deformation element may preferably have a honeycomb structure. Suitable structures for taking up forces and moments arising in the event of an impact are well known to a person skilled in the art. The deformation element is thus expediently configured i) on the one hand to transmit the forces and moments arising during conventional operation to the bodyshell element and ii) on the other hand to deform, in order to thus absorb the energy, in the event of forces and moments which are greater than the forces and moments arising during conventional operation (e.g. in the event of an accident). The deformation element may comprise honeycomb sheets and/or fiber-reinforced structures, for example. By means of the energy dissipation path, it is possible to ensure that the energy resulting from a side impact, for example, is converted into deformation work, with the result that the action of the impact has a lesser effect on the pressure vessel. Furthermore, the hard shell additionally ensures that the energy, if indeed it arrives at the pressure vessel, is transmitted in the first instance to the wall of the pressure vessel and does not act or acts to a lesser extent on the fuel-carrying connection element.

The motor vehicle comprises at least one fuel-carrying connection element, which is provided on an outlet of the pressure vessel. In one embodiment, the fuel-carrying connection element is a tank shut-off valve, which may be fastened detachably on the pressure vessel. In other embodiments, a shut-off valve is not provided directly on each pressure vessel, in particular if a common distributor tube is provided. In that case, for example, the distributor tube may form the connection element.

The vehicle bodyshell element may be a longitudinal member, in particular a door sill, or a crossmember of the vehicle bodyshell. Accordingly, the pressure vessel may be installed in the vehicle longitudinal direction or in the vehicle transverse direction. If multiple pressure vessels with comparatively small diameters are installed, when installed in the vehicle transverse direction they may be arranged in such a way that the underfloor space is optimally utilized. For example, it would be possible to arrange more pressure vessels one on top of another below the seats for the occupants or banks of seats for the occupants than in the area below the footwell area.

For the purpose of better accessibility of the pressure vessel mounted in the motor vehicle, in particular for the purpose of better accessibility of the outlet from the pressure vessel or of the fuel-carrying connection element, the hard shell may have a multi-part form. For this purpose, it is possible to provide, for example, that all parts of the holder (i.e. of the hard shell and inner layer) that are provided on one side (e.g. toward the vehicle floor) and of the deformation element are mounted in a reversibly detachable manner in the installation position. For this purpose, it is possible to provide a form-fitting connection, for example. In one embodiment, it is possible for these parts to be able to be assembled from multiple directions. This makes it possible to realize an especially mounting- or service-friendly construction. In the case of such a pressure vessel bodyshell attachment, the lines can be mounted more easily. Advantageously, parts of the deformation element may be formed in one piece with parts of the holder. For example, the parts provided on the same side in the installation position may be formed in one piece. This facilitates the mounting and the service of the pressure vessel and the lines.

In other words, the technology disclosed here relates to a pressure vessel system with the following basic elements:
- a hard layer for improved distribution of the load over the surface area,
- a soft layer for reducing the pressure peaks on the tank surface, and
- a dimensionally adapted holder above the dome region with energy-absorbing properties.

The dimensionally adapted, energy-absorbing holder is expediently constructed in multiple parts. The basic elements may be multilayered. The basic elements may further comprise auxetic layers.

The basic elements "hard layer" and "soft layer" together with the dimensionally adapted holder are comparable to the principle of the crash helmet. The deformation element and the holder form a combined holding/crash element, which facilitates the mounting and the service. In addition, the installation space available is utilized more efficiently. It is thus advantageously possible to utilize the space between the door sill and the tank contour as completely as possible for the purpose of dissipating energy.

The hard shell makes it possible to reduce the action of loading that occurs at certain points or over a small surface area, since a comparatively sharp action is distributed over as much of the surface area as possible by the hard shell.

The technology disclosed here will now be explained with reference to the schematic FIGURE.

BRIEF DESCRIPTION OF THE DRAWING

FIG. 1 is a schematic cross-sectional view of a pressure vessel according to an embodiment of the disclosure.

DETAILED DESCRIPTION OF THE DRAWING

Referring to FIG. 1, a pressure vessel 200 is attached to the vehicle bodyshell element 100 in a load-bearing manner. In this instance, the vehicle bodyshell element 100 is a longitudinal member, in particular an external door sill. The vehicle bodyshell element 100 comprises a vehicle outer skin 110. The pressure vessel 200 comprises a fuel-carrying connection element 210. In this instance, the connection element 210 is a vessel valve. The holder 30 comprises a hard layer or hard shell 300. The hard shell 300 is molded on the surface of the pressure vessel 200 and of the vessel valve 210. In other words, the contour of the hard shell 300 corresponds to the outer contour of the end of the pressure vessel 200. The outer contour is formed by the end of the pressure vessel 200 and the connection element 210. A soft layer or inner layer 310 is located between the hard shell 300 and the surface of the pressure vessel 200 and of the connection element 210.

The hard shell 300 in turn is encompassed or embedded in an energy-absorbing holder or energy-absorbing deformation element 320, which extends as far as the vehicle bodyshell element. The hard shell 300 has a rigid form such that a force, for example of at least 25 kN or at least 5 kN or at least 1 kN, impinging on the hard shell at certain points or over a small surface area (e.g. less than 50 cm$^2$ or less than 25 cm$^2$ or less than 16 cm$^2$ or less than 9 cm$^2$ or less than 4 cm$^2$ or less than 1 cm$^2$) is distributed over a large surface area without the hard shell 300 being destroyed in the process. The hard shell 300 is preferably produced from one of the following materials: metals, metal alloys (e.g. steel), and/or fiber composite materials (e.g. carbon-fiber-reinforced and/or aramid-fiber-reinforced and/or glass-fiber-reinforced fiber composite materials).

The inner layer 310 ensures mediation between the surfaces of the pressure vessel 200 or connection element 210 and the hard shell 300. In this way, force peaks are avoided even in the event of surfaces which are not molded on perfectly. The inner layer 310 in particular has a flexible configuration such that the inner layer 310 can adapt to the outer contour of the end of the pressure vessel 200 in the installation position, in particular even to outer contours that deviate on account of mounting tolerances or designs using identical parts. Furthermore, the inner layer 310 may have a flexible design such that the inner layer 310 reversibly compensates proper operational vessel expansions (in particular also those resulting from the internal pressure). The inner layer 310 is preferably produced from a plastic, in particular from a polymer, elastomer and/or foamed plastic. For fall protection purposes, the inner layer 310 may also be configured such that the holder 30, in particular the hard shell 300 and inner layer 310, at least partially take up the impulse resulting from the fall of the pressure vessel.

The energy-absorbing deformation element 320 (also referred to as energy-absorbing holder) may be configured in the manner of a crash element and comprise honeycomb sheets or fiber composite structures, for example. In this respect, it is in particular also possible to use structures with auxetic behavior (negative Poisson number). These have the advantage that, in the event of local penetration of an impactor, they are compressed below the penetration point and therefore counteract penetration with particularly great resistance and thus ensure a distribution of the force over a larger surface area. In order to facilitate the mounting and the service of the pressure vessel and the lines, it is possible to provide that the deformation element 320 and/or the holder 30 is constructed from multiple parts or segments. In this respect, each part may be a component unit, which comprises parts of the holder 30 and of the deformation element 320 and connects them in one piece. Given a corresponding configuration, the parts can thus be laid around the pressure vessel 200, around the connection element 210 and any fuel-carrying lines. Advantageously, the available volume can therefore be utilized as completely as possible. Form-fitting connections are preferably provided between the parts, for example toothings or pins, with the result that the parts can be easily plugged together in the manner of a three-dimensional puzzle. A suitable configuration therefore makes it possible to correspondingly suitably transmit the forces.

The invention claimed is:

1. A motor vehicle, comprising:
at least one pressure vessel for storing fuel; and
at least one holder for holding the pressure vessel, wherein
the holder encloses one end of the pressure vessel in an installation position,
the holder comprises a hard shell and an inner layer,
the inner layer is arranged at least in certain regions between the hard shell and a fuel-carrying connection element in the installation position, and
the inner layer has a flexible configuration that is reversibly adaptable to a contour of the fuel-carrying connection element.

2. The motor vehicle according to claim 1, wherein
the fuel-carrying connection element is provided on an outlet of the pressure vessel, and
the holder encloses the connection element in the installation position in order to protect the fuel-carrying connection element.

3. The motor vehicle according to claim 1, wherein
the inner layer lies against an outer wall of the pressure vessel at one end of the pressure vessel.

4. The motor vehicle according to claim 1, further comprising:
an energy-absorbing deformation element arranged between the holder and a vehicle bodyshell element in a direction of a pressure vessel longitudinal axis when in the installation position.

5. The motor vehicle according to claim 4, wherein
the deformation element connects the pressure vessel to the vehicle bodyshell element in a load-bearing manner.

6. The motor vehicle according to claim 1, wherein
the vehicle bodyshell element is a longitudinal member or a crossmember of the vehicle bodyshell.

7. The motor vehicle according to claim 1, wherein
the holder has a multi-part form to provide better accessibility of the pressure vessel mounted in the motor vehicle; and/or
the deformation element has a multi-part form to provide better accessibility of the pressure vessel mounted in the motor vehicle.

8. The motor vehicle according to claim 7, wherein
parts of the holder and of the deformation element that are provided on the same side in the installation position form a one-piece structural element.

9. The motor vehicle according to claim 1, wherein
the inner layer has a flexible design such that the inner layer reversibly changes in length caused by the operation of the at least one pressure vessel.

10. The motor vehicle according to claim 1, wherein
the motor vehicle comprises multiple pressure vessels, and
the holder is configured to enclose: i) ends, ii) multiple connection elements or a distributor tube, of the multiple pressure vessels.

11. The motor vehicle according to claim 10, wherein
a common distributor tube forms the connection element,
the multiple pressure vessels are connected directly to the common distributor tube without a respective shut-off valve being provided between the common distributor tube and individual ones of the multiple pressure vessels.

12. The motor vehicle according to claim 11, wherein the holder encloses the common distributor tube.

13. The motor vehicle according to claim 1, wherein the inner layer encloses the fuel-carrying connection element in the installation position.

14. The motor vehicle according to claim 1, wherein at an axial end the pressure vessel the inner layer directly contacts the fuel-carrying connection element.

15. The motor vehicle according to claim 1, wherein the inner layer has a greater thickness than a thickness of the hard shell.

16. The motor vehicle according to claim 1, wherein the inner layer has a given flexibility that reversibly compensates operational vessel expansions resulting from an internal pressure of the at least one pressure vessel.

* * * * *